Figure 1:
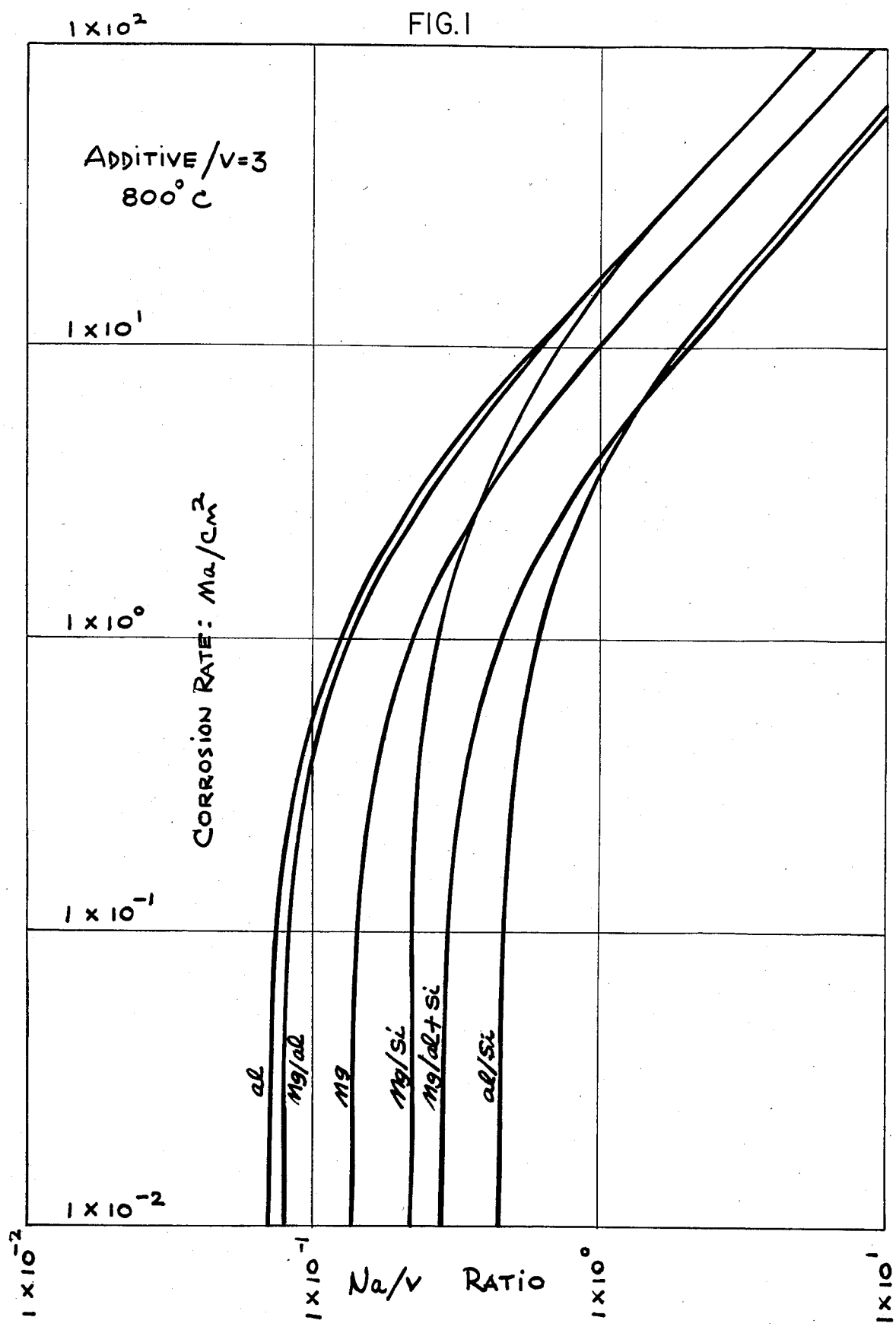

United States Patent [19]

May et al.

[11] Patent Number: 4,659,339

[45] Date of Patent: Apr. 21, 1987

[54] INHIBITION OF CORROSION IN FUELS WITH MG/AL/SI COMBINATIONS

[75] Inventors: Walter R. May; Michael J. Zetlmeisl, both of St. Louis, Mo.

[73] Assignee: Petrolite Corporation, St. Louis, Mo.

[21] Appl. No.: 9,319

[22] Filed: Feb. 5, 1979

Related U.S. Application Data

[63] Continuation of Ser. No. 563,571, Mar. 31, 1975, abandoned.

[51] Int. Cl.[4] .................................................. C10L 1/30
[52] U.S. Cl. ........................................... 44/68; 44/51; 44/67; 44/DIG. 3
[58] Field of Search ...................... 44/51, 68, DIG. 3

[56] References Cited

U.S. PATENT DOCUMENTS 2,440,756  5/1948  Oulton ................................. 252/450
2,551,580  5/1951  Bond .................................... 252/450

FOREIGN PATENT DOCUMENTS 200149  11/1955  Australia ........................ 44/DIG. 3
200447  11/1955  Australia ........................ 44/DIG. 3
744141  2/1956  United Kingdom ........... 44/DIG. 3

OTHER PUBLICATIONS

Proceedings of the Third National Conference on Clays and Clay Minerals, Nat'l Acad. of Sci., Wash., D.C., 1955, pp. 269 and 270.

*Primary Examiner*—Mrs. Y. Harris-Smith
*Attorney, Agent, or Firm*—S. B. Ring; L. Zitver

[57] ABSTRACT

This invention relates to the inhibition of corrosion resulting from the presence of vanadium and sodium in fuels, for example, in residual fuels, such as in those fuels used in steam boilers, process heaters and gas turbines, etc., by adding Mg/Al/Si combinations thereto. Mg/Al/Si combinations are more effective than other inhibitors at a high Na/V ratio.

14 Claims, 2 Drawing Figures

INHIBITION OF CORROSION IN FUELS WITH MG/AL/SI COMBINATIONS

This is a continuation of application Ser. No. 563,571, filed Mar. 31, 1975, abandoned.

The demand for greatly increased amounts of energy has forced utilities and other large-quantity users of fossil fuels to explore low-quality fuels for use in steam boilers and gas turbines. Fuels such as unrefined crude oil and residual oil contain large amounts of impurities which result in corrosive deposits in the equipment. Two of these impurities, sodium and vanadium, form catastrophically corrosive, low melting slags that can destroy a vital part in a matter of hours.

Crude oil usually contains 1-500 ppm of vanadium in the form of a porphyrin complex depending on the source. Because of its origin as a concentrate from the refining process, residual oil contains several times more vanadium than the crude from which it was derived. The combustion of these vanadium-containing fuels produces very corrosive $V_2O_5$ deposits which can destroy a turbine part in a matter of days. Although the vanadium can be removed, the cost of the process cancels the economic advantage of using unrefined fuels. Vanadic corrosion is, therefore, usually controlled with chemical additives and optimization of operating conditions.

Sodium is almost always present in low-quality fuels, either directly in the crude oil or indirectly through contamination from various sources. The technology for removing sodium is well developed. These are limiting processes, however, and a trace of sodium must always be dealt with. For example, in maritime use the sodium level can be increased because of the introduction of sodium chloride through the air intake and contamination of the fuel by sea water. During combustion, the sodium reacts with the sulfur in the fuel to form the sulfate which is deposited in turbine parts. This reaction has been shown to be thermodynamically favored and results in the only sodium compound that will deposit under these conditions.

The mechanism of corrosion by vanadium and sodium has received much attention. Nascent oxygen species has been proposed as the corrosive active agent in $V_2O_5$ melts. Various mechanisms have been presented to explain corrosive attack by sodium sulfate at metal surfaces. The classical method of inhibiting the corrosive characteristics of $V_2O_5$ and $Na_2SO_4$ melts has been to form high-melting vanadates of the former and minimize the level of the latter. Magnesium has been the most successful substance for this type of protection. The optimum levels of magnesium addition are not precisely known. Just as the mechanism of corrosion is only partially understood, so too is that of its inhibition.

There are other methods of limiting corrosion and slag formation such as reducing the operating temperature and maintaining the air to fuel ratio so that slightly reducing conditions exist during combustion. These types of methods may not be applicable. For example, the air to fuel ratio cannot be lowered to obtain reducing conditions in a gas turbine. Lower operating temperatures make the system less efficient and may be ruled out for economic reasons. Thus, chemical additives are often the best way to inhibit corrosion and slag formations.

Although many corrosion inhibitors are effective in reducing corrosion and producing dry friable slats, their effectiveness diminishes as the sodium concentration in the fuel increases.

We have discovered that the presence of magnesium, aluminum and silicon combinations inhibits corrosion and produces dry, friable slag when impure fuels are burnt in gas turbine and steam boilers.

We have further discovered that the magnesium, aluminum and silicon combinations are more effective at high Na/V ratios compared to other corrosion inhibitors such as magnesium and magnesium-silicon. Stated another way, Mg/Al/Si combiantions allow the highest Na/V ratio at a given corrosion rate.

Magnesium, aluminum and silicon combinations also produce friable, easy-to-remove slags at higher Na/V ratios than previously known inhibitors.

The corrosion rates of materials used in gas turbine, furnace and steam boiler construction in sodium-vanadium-sulfur containing slags may be determined by a variety of methods. The most reliable method is a field test in operating equipment. However, because of the costs involved, a variety of tests have been designed to either duplicate or reflect actual field conditions. These range from high-pressure test rigs which are similar to gas turbines on a smaller scale to simple crucible tests carried out in a laboratory muffle furnace.

The following Examples are presented for purposes of illustration and not of limitation.

EXAMPLES

We have developed an electrochemical technique for measuring corrosion rates in a laboratory scale furnace that accurately reflects the situation observed in larger test facilities and in the field. This technique is described in the article "High-Temperature Corrosion in Gas Turbines and Steam Boilers by Fuel Impurities. I. Measurement of Nickel Alloy Corrosion Rate in Molten Salts by Linear Polarization Technique," by Walter R. May, et. al, *Industrial and Engineering Chemistry, Product Research and Development,* Vol. 11, No. 4, pg. 438, 1972. The data presented below in support of this disclosure was obtained by this technique. Good correlation has been found between data from this test and field data. Data on magnesium are published in the articles "High-Temperature Corrosion in Gas Turbines and Steam Boilers by Fuel Impurities. II. The Sodium Sulfate-Magnesium Sulfate-Vanadium Pentoxide System" and "III. Evaluation of Magnesium as a Corrosion Inhibitor," *Industrial and Engineering Chemistry,* Vol. 12, No. 2, pgs. 140–149, 1973. Data on silicon and the magnesium-silicon combination were published in the article "High-Temperature Corrosion in Gas Turbines and Steam Boilers by Fuel Impurities. IV. Evaluation of Silicon and Magnesium-Silicon as Corrosion Inhibitors," *Transactions of the ASME, Journal of Engineering for Power,* Vol. 96, 1974, pp. 124–128." A test for evaluation of slag friability resulting from burning fuels containing these additives is given in this article.

Corrosion data obtained by the above procedure is presented and discussed below.

Since the above procedure gives a good approximation of the corrosion rate on Udimet-500 Alloy, we have evaluated synthetic slags to find conditions in which Mg/Al/Si will inhibit corrosion on this alloy. Employing varying Na-Mg-Al-Si-V ratios, such slags were screened. It was found the corrosion could be inhibited by Mg/Al/Si more effectively at higher Na/V ratios than any other corrosion inhibiting system tested.

The "Maximum Acceptable Corrosion Rate" involving corrosion rate versus temperature corresponds to a 20 mils per year corrosion rate. An acceptable life for a turbine bucket or nozzle is three years which is approximately 40 mils per year. Since our tests have an accuracy within a factor of 2, we have designated the 20 mils per year rate as our target. In terms of corrosion current as measured by our tests, this is 0.05 ma/cm². In some industrial applications, higher rates could be allowable based on economic considerations.

Corrosivities based on corrosion current (I corr) for Udimet 500 tested in $Na_2SO_4$-$V_2O_5$ melts containing various weight ratios of aluminum, magnesium and silicon are presented in Tables I–IV. These data were evaluated by stepwise regression analysis and linear correlation equations for these systems are presented in Table V. The equations for magnesium and magnesium-silicon are included for comparison. The data for these latter systems were published in the article cited above. These equations are valid for the range 800°–950° C., Na/V ratio of 0.01 to 10 and additive to vanadium ratio to 1 to 6. Values calculated from these equations at 800° C. and additive/vanadium ratio of 3 are plotted in FIG. 1. These plots indicate that for the stated conditions, the corrosion rate can be reduced to zero for a given Na/V ratio. The higher the Na/V ratio for zero corrosion rate, the better the additive. At 800° C., the 2 Al/Mg/-3Si combination is superior to Al, Al/Mg, Mg or Mg/Si and is exceeded only by the Al/Si combination.

Figure 2:
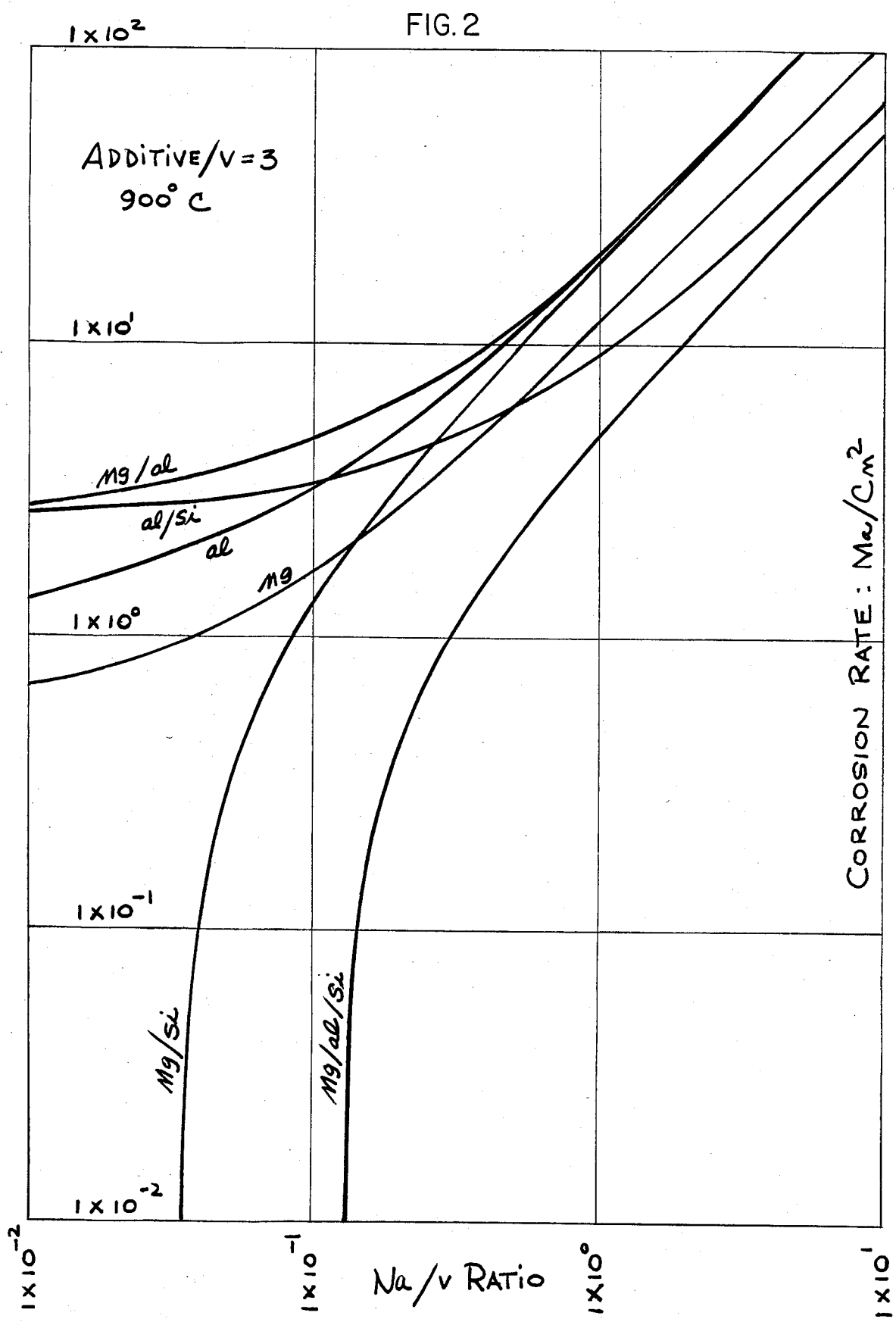

In FIG. 2, the superiority of Mg/Al/Si over the other combinations is demonstrated at 900° C. Only the Mg/Si and Mg/Al/Si combinations can reduce corrosion to a minimum at 900° and the Mg/Al/Si combination has a three fold higher tolerance to sodium than the Mg/Si system at this temperature.

Similar data were developed for slag friability by the technique described in the article cited above. The data are presented in Table VI. Comparisons of the friability data (% wt. change on brushing) illustrates that the data for the Mg/Al/Si system is at least equivalent to and in most cases is superior to the data for the other systems cited at both 750° and 900° C.

Based on the evidence cited herein, the Mg/Al/Si combination gives superior corrosion protection at higher Na/V ratios than any known high-temperature corrosion inhibitor and also modifies the slag sufficiently to give satisfactory friability. Because of difficulty in preventing sodium contaminaion and fuel washing, the higher sodium tolerance allows an obvious superiority.

The amount of Mg/Al/Si employed will vary depending on the impurities present in the fuel. The amounts required can be calculated from the linear correlation equations and knowledge of the sodium and vanadium levels in the fuel. In practice, the weight ratios of Mg/Al/Si can vary from $$\frac{Mg + Al + Si}{V} = 0.25 \text{ to } 10$$

but preferably from about 0.75 to 6.0. The actual levels added to a fuel can vary from about 1.0 ppm for a fuel containing 1.0 ppm V and 1.0 ppm Na to as high as 5000 ppm for a fuel containing 500 ppm V and 300 ppm Na.

The ratio of Mg to Al can vary from 0.01 to 100 but will probably be in the 0.1 to 10 range. The (Mg+Al/Si) ratio can also vary from 0.01 to 100 but is preferably in the 0.1 to 10 range.

For the purposes of this invention, the Mg/Al/Si combination can be added in any chemical form in which magnesium and aluminum constitute 100% of the metals present, and that will involve dispersion throughout the fuel prior to combustion. The chemicals can be in inorganic forms such as sulfates, oxides or carbonates or in organic oil soluble form.

In summary, two factors must be considered in evaluating an additive of this invention, namely, corrosion inhibition and modification of slag properties. Sodium aggravates both factors. Because of the ease with which fuel and intake air can become contaminated with sodium, a tolerance to increased sodium level brought about by an improved additive is very beneficial. The Mg/Al/Si additive system offers additional flexibility in sodium level over the Mg/Al and Mg/Si systems by reducing corrosion at higher Na/V ratios as indicated by the curves in the Figures. Examination of slag data in Table VI illustrates that the Mg/Al/Si system gives friability data at least equivalent to and in most cases superior to data for the other systems cited.

It will be apparent that various changes and modifications may be made in this invention described herein without departing from the scope of this invention. It is intended, therefore, that all matter contained herein shall be interpreted as illustrative and not limitative.

TABLE I

| | | | | | | | | | |
|---|---|---|---|---|---|---|---|---|---|
| Icorr For Udimet-500 In $Na_2SO_4$—$Al_2O_3$—$V_2O_5$ From 800° C.-950° C. | | | | | | | | | |
| Ratio | | Mole Percent | | | Icorr | | | | |
| Na/V | Al/V | $Na_2SO_4$ | $Al_2O_3$ | $V_2O_5$ | 800 | 850 | 900 | 950 | Washability |
| 1 | 1 | 43.41 | 36.99 | 19.59 | 35.00 | 43.80 | 52.50 | 61.30 | Poor |
| 1 | 2 | 31.69 | 54.01 | 14.30 | 23.00 | 26.50 | 35.40 | 36.30 | Fair |
| 1 | 3 | 24.95 | 63.79 | 11.26 | 8.60 | 10.30 | 12.05 | 13.80 | Good |
| 1 | 4 | 20.58 | 70.14 | 9.29 | 4.85 | 5.33 | 5.82 | 7.28 | Good |
| 1 | 5 | 17.51 | 74.59 | 7.90 | .832 | 1.39 | 1.75 | 2.35 | Good |
| 0.1 | 1 | 7.13 | 60.72 | 32.16 | 4.73 | 6.45 | 11.15 | 15.49 | Poor |
| 0.1 | 2 | 4.43 | 75.56 | 20.01 | .40 | .40 | .50 | .60 | Good |
| 0.1 | 3 | 3.22 | 82.26 | 14.52 | .20 | .27 | .36 | .43 | Good |
| 0.1 | 4 | 2.53 | 86.08 | 11.40 | .092 | .123 | .156 | .214 | Good |
| 0.1 | 5 | 2.08 | 88.54 | 9.38 | .089 | .111 | .134 | .223 | Good |
| 0.01 | 1 | 0.76 | 64.88 | 34.36 | 1.47 | 2.31 | 3.77 | 5.85 | Good |
| 0.01 | 2 | 0.46 | 78.70 | 20.84 | .161 | .242 | .334 | .528 | Good |
| 0.01 | 3 | 0.33 | 84.71 | 14.96 .089 | .124 | .148 | .228 | Good | |
| 0.01 | 4 | 0.26 | 88.08 | 11.66 | .071 | .081 | .119 | .162 | Good |
| 0.01 | 5 | 0.21 | 90.23 | 9.56 | .069 | .108 | .118 | .176 | Good |
| 0.001 | 1 | 0.08 | 65.32 | 34.60 | 1.07 | 1.60 | 2.72 | 12.25 | Good |
| 0.001 | 2 | 0.05 | 79.03 | 20.93 | .203 | .351 | .775 | 1.800 | Good |
| 0.001 | 3 | 0.03 | 84.97 | 15.00 | .086 | .257 | .285 | .827 | Good |
| 0.001 | 4 | 0.03 | 88.28 | 11.69 | .035 | .044 | .055 | .079 | Good |

TABLE I-continued

Icorr For Udimet-500 In Na₂SO₄—Al₂O₃—V₂O₅ From 800° C.-950° C.

| Ratio | | Mole Percent | | | Icorr | | | | |
|---|---|---|---|---|---|---|---|---|---|
| Na/V | Al/V | Na₂SO₄ | Al₂O₃ | V₂O₅ | 800 | 850 | 900 | 950 | Washability |
| 0.001 | 5 | 0.02 | 90.40 | 9.58 | .046 | .055 | .073 | .101 | Good |

TABLE II

Icorr For Udimet-500 In Na₂SO₄—MgSO₄—Al₂O₃—V₂O₅ From 800° C.-950° C.

| Ratio | | | Mole Percent | | | | Icorr | | | | |
|---|---|---|---|---|---|---|---|---|---|---|---|
| Na/V | Mg/V | Al/V | Na₂SO₄ | MgSO₄ | Al₂O₃ | V₂O₅ | 800 | 850 | 900 | 950 | Washability |
| 1 | 1 | 1 | 23.8403 | 45.0875 | 20.3133 | 10.7590 | 28.4 | 38.0 | 47.4 | 49.8 | Poor |
| 1 | 2 | 1 | 16.4317 | 62.1521 | 14.0007 | 7.4155 | .0485 | 12.230 | 19.40 | 19.40 | Poor |
| 1 | 3 | 1 | 12.5360 | 71.1252 | 10.6814 | 5.6574 | 1.240 | 25.80 | 25.80 | 27.80 | Poor |
| 1 | 2 | 2 | 14.4137 | 54.5191 | 24.5625 | 6.5048 | 1.96 | 11.76 | 39.20 | 39.20 | Poor |
| 1 | 1 | 3 | 16.9529 | 32.0618 | 43.3345 | 7.6507 | 2.630 | 5.980 | 8.380 | 9.850 | Good |
| 1 | 3 | 2 | 11.3262 | 64.2613 | 19.3011 | 5.1114 | .3330 | 8.97 | 21.6 | 21.6 | Poor |
| 1 | 3 | 3 | 10.3293 | 58.6055 | 26.4036 | 4.6616 | .280 | 3.020 | 7.190 | 16.90 | Poor |
| 0.1 | 1 | 1 | 3.0353 | 57.4043 | 25.8624 | 13.6981 | .8340 | 3.230 | 5.060 | 14.700 | Poor |
| 0.1 | 2 | 1 | 1.9233 | 72.9386 | 16.4306 | 8.7025 | .0284 | .1135 | .220 | .562 | Good |
| 0.1 | 3 | 1 | 1.4130 | 80.1704 | 12.0397 | 6.3769 | .122 | .245 | .544 | .998 | Good |
| 0.1 | 2 | 2 | 1.6562 | 62.6456 | 28.2238 | 7.4744 | .0300 | .0500 | .0900 | .2210 | Good |
| 0.1 | 1 | 3 | 2.0005 | 37.8345 | 51.1368 | 9.0282 | .0208 | .0520 | .1320 | .7370 | Good |
| 0.1 | 3 | 2 | 1.2612 | 71.5553 | 21.4919 | 5.6916 | .0213 | .0320 | .0421 | .0970 | Good |
| 0.1 | 3 | 3 | 1.1380 | 64.6121 | 29.1098 | 5.1393 | .0726 | .0980 | .1960 | .4370 | Good |
| 0.01 | 1 | 1 | .3121 | 59.0165 | 26.5887 | 14.0828 | .0970 | .1500 | .3536 | .3536 | Good |
| 0.01 | 2 | 1 | .1962 | 74.2268 | 16.7207 | 8.8562 | .0228 | .0466 | .0940 | .1929 | Good |
| 0.01 | 3 | 1 | .1431 | 81.2030 | 12.1948 | 6.4590 | .0507 | .0451 | .0339 | .0339 | Good |
| 0.01 | 2 | 2 | .1681 | 63.5935 | 28.6509 | 7.5875 | .0134 | .0176 | .0134 | .0176 | Good |
| 0.01 | 1 | 3 | .2037 | 38.5282 | 52.0744 | 9.1938 | .0053 | .0106 | .0159 | .0266 | Good |
| 0.01 | 3 | 2 | .1276 | 72.3768 | 21.7387 | 5.7500 | .0200 | .0300 | .0400 | .0500 | Good |
| 0.01 | 3 | 3 | .1151 | 65.2812 | 29.4112 | 5.1926 | .0106 | .0212 | .0318 | .0371 | Good |
| 0.001 | 1 | 1 | .0313 | 59.1827 | 26.6636 | 14.1224 | .0288 | .0346 | .0692 | .2020 | Good |
| 0.001 | 2 | 1 | .0197 | 74.3582 | 16.7503 | 8.8718 | .0132 | .0184 | .0414 | .0825 | Good |
| 0.001 | 3 | 1 | .0143 | 81.3078 | 12.2106 | 6.4673 | .0175 | .0300 | .0500 | .1100 | Good |
| 0.001 | 2 | 2 | .0168 | 63.6899 | 28.6943 | 7.5990 | .0496 | .0496 | .1485 | .1980 | Good |
| 0.001 | 1 | 3 | .0204 | 38.5989 | 52.1700 | 9.2106 | .0194 | .0194 | .0485 | .1321 | Good |
| 0.001 | 3 | 2 | .0128 | 72.4600 | 21.7636 | 5.7636 | .0068 | .0050 | .0101 | .0254 | Good |
| 0.001 | 3 | 3 | .0115 | 65.3489 | 29.4417 | 5.1979 | .0701 | .0701 | .0600 | .0400 | Good |

TABLE III

Icorr for Udimet 500 in Various Na₂SO₄—Al₂O₃—SiO₂—V₂O₅ Melts from 800° C.-950° C.

| Ratio | | | Icorr | | | | |
|---|---|---|---|---|---|---|---|
| Na/V | Al/V | Si/V | 800° | 850° | 900° | 950° | Washability |
| 1 | 1 | 1 | 2.80 | 7.47 | 10.28 | 10.28 | Poor |
| 1 | 2 | 1 | 5.5 | 6.62 | 7.16 | 14.35 | Fair |
| 1 | 3 | 1 | 4.71 | 5.89 | 7.50 | 10.39 | Good |
| 1 | 2 | 2 | — | 13.6 | 18.4 | 25.2 | Fair |
| 1 | 1 | 3 | 7.0 | 10.0 | 14.0 | 14.0 | Good |
| 1 | 3 | 2 | .215 | .269 | .324 | .486 | Good |
| 1 | 3 | 3 | .145 | .388 | .485 | .970 | Good |
| 0.1 | 1 | 1 | 12.85 | 13.50 | 13.50 | 19.60 | Good |
| 0.1 | 2 | 1 | .746 | .840 | .934 | 1.400 | Good |
| 0.1 | 3 | 1 | .0442 | .0442 | .0884 | .0884 | Good |
| 0.1 | 2 | 2 | .1075 | .1185 | .162 | .250 | Good |
| 0.1 | 1 | 3 | .479 | .533 | .533 | .424 | Fair |
| 0.1 | 3 | 2 | .029 | .038 | .048 | .096 | Good |
| 0.1 | 3 | 3 | .051 | .093 | .126 | .186 | Good |
| 0.01 | 1 | 1 | .588 | .735 | 1.029 | 1.421 | Good |
| 0.01 | 2 | 1 | .0165 | .0165 | .0235 | .0235 | Good |
| 0.01 | 3 | 1 | .034 | .034 | .038 | .038 | Good |
| 0.01 | 2 | 2 | .038 | .043 | .067 | .114 | Good |
| 0.01 | 1 | 3 | .0198 | .0297 | .0297 | .0495 | Good |
| 0.01 | 3 | 2 | .0209 | .0209 | .0293 | .0545 | Good |
| 0.01 | 3 | 3 | .206 | .183 | .274 | .320 | Good |
| 0.001 | 1 | 1 | .856 | 1.320 | 1.620 | 2.310 | Good |
| 0.001 | 2 | 1 | .5200 | .7600 | 1.170 | 1.650 | Good |
| 0.001 | 3 | 1 | .0082 | .0145 | .023 | .0416 | Good |
| 0.001 | 2 | 2 | .025 | .021 | .027 | .042 | Good |
| 0.001 | 1 | 3 | .040 | .075 | .140 | .230 | Good |
| 0.001 | 3 | 2 | .068 | .038 | .068 | .076 | Good |
| 0.001 | 3 | 3 | .037 | .037 | .041 | .046 | Good |

TABLE IV

Icorr for Udimet 500 in Various Na₂SO₄—MgSO₄—SiO₂—Al₂O₃—V₂O₅ Melts from 800° C.-950° C.

| Mole Percent | | | | | Ratio | | | | Icorr | | | | Washability |
|---|---|---|---|---|---|---|---|---|---|---|---|---|---|
| Na₂SO₄ | MgSO₄ | SiO₂ | Al₂O₃ | V₂O₅ | Na/V | Mg/V | Si/V | Al/V | 800° | 850° | 900° | 950° | |
| 17.15 | 32.43 | 28.07 | 14.61 | 7.74 | 1 | 1 | 1 | 1 | 7.751 | 12.60 | 21.40 | 22.30 | Poor |
| 12.95 | 48.98 | 21.20 | 11.03 | 5.84 | 1 | 2 | 1 | 1 | .8540 | 5.718 | 5.718 | 5.718 | Poor |
| 13.39 | 25.32 | 43.84 | 11.41 | 6.04 | 1 | 1 | 2 | 1 | 2.04 | 3.34 | 4.09 | 5.20 | Fair |
| 14.96 | 28.30 | 24.49 | 25.50 | 6.75 | 1 | 1 | 1 | 2 | 1.58 | 3.16 | 4.74 | 6.33 | Fair |
| 10.68 | 40.41 | 34.98 | 9.10 | 4.82 | 1 | 2 | 2 | 1 | 1.96 | 2.84 | 4.37 | 10.5 | Poor |
| 11.66 | 44.11 | 19.09 | 19.87 | 5.26 | 1 | 2 | 1 | 2 | 3.14 | 4.5 | 5.05 | 13.5 | Fair |
| 12.02 | 22.73 | 39.35 | 20.48 | 5.42 | 1 | 1 | 2 | 2 | .899 | 1.350 | 1.890 | 3.380 | Fair |
| 9.79 | 37.04 | 32.06 | 16.69 | 4.42 | 1 | 2 | 2 | 2 | 1.91 | 3.06 | 3.44 | 6.13 | Poor |
| 2.03 | 38.35 | 33.20 | 17.28 | 9.15 | 0.1 | 1 | 1 | 1 | .0915 | .275 | .870 | 1.00 | Good |
| 1.47 | 55.44 | 23.99 | 12.49 | 6.61 | 0.1 | 2 | 1 | 1 | .098 | .059 | .059 | .382 | Good |
| 1.52 | 28.79 | 49.84 | 12.97 | 6.87 | 0.1 | 1 | 2 | 1 | .0241 | .0420 | .1045 | .1285 | Good |
| 1.73 | 32.70 | 28.31 | 29.46 | 7.80 | 0.1 | 1 | 1 | 2 | .0273 | .0640 | .1280 | .1074 | Good |
| 1.18 | 44.71 | 38.70 | 10.07 | 5.33 | 0.1 | 2 | 2 | 1 | .0298 | .0894 | .129 | .228 | Good |
| 1.30 | 49.28 | 21.33 | 22.20 | 5.88 | 0.1 | 2 | 1 | 2 | .0266 | .0452 | .1130 | .1730 | Good |
| 1.35 | 25.49 | 44.12 | 22.96 | 6.08 | 0.1 | 1 | 2 | 2 | .0280 | .0654 | .1582 | .2150 | Good |
| 1.07 | 40.62 | 35.16 | 18.30 | 4.85 | 0.1 | 2 | 2 | 2 | .0235 | .0392 | .1175 | .1961 | Good |
| 0.21 | 39.06 | 33.81 | 17.60 | 9.32 | 0.01 | 1 | 1 | 1 | .0320 | .0320 | .1815 | .2020 | Good |
| 0.15 | 56.18 | 24.31 | 12.66 | 6.70 | 0.01 | 2 | 1 | 1 | .0391 | .0705 | .1019 | .1175 | Good |
| 0.15 | 29.19 | 50.54 | 13.15 | 6.97 | 0.01 | 1 | 2 | 1 | .0181 | .0181 | .0272 | .0453 | Good |
| 0.18 | 33.22 | 28.75 | 29.93 | 7.93 | 0.01 | 1 | 1 | 2 | .0222 | .0222 | .0222 | .0222 | Good |
| 0.12 | 45.19 | 39.12 | 10.18 | 5.39 | 0.01 | 2 | 2 | 1 | .0219 | .0219 | .0292 | .0360 | Good |
| 0.13 | 49.87 | 21.58 | 22.47 | 5.95 | 0.01 | 2 | 1 | 2 | .0170 | .0170 | .0170 | .0170 | Good |
| 0.14 | 25.80 | 44.66 | 23.25 | 6.16 | 0.01 | 1 | 2 | 2 | .0300 | .0229 | .0191 | .0229 | Good |
| 0.11 | 41.02 | 35.50 | 18.48 | 4.89 | 0.01 | 2 | 2 | 2 | .0222 | .0222 | .0222 | .0222 | Good |
| 0.02 | 39.13 | 33.88 | 17.63 | 9.34 | 0.001 | 1 | 1 | 1 | .0072 | .0192 | .0288 | .0480 | Good |
| 0.01 | 56.25 | 24.35 | 12.67 | 6.71 | 0.001 | 2 | 1 | 1 | .0184 | .0442 | .0884 | .0955 | Good |
| 0.02 | 29.23 | 50.61 | 13.17 | 6.98 | 0.001 | 1 | 2 | 1 | .0405 | .0269 | .0269 | .0269 | Good |
| 0.02 | 33.27 | 28.80 | 29.98 | 7.94 | 0.001 | 1 | 1 | 2 | .0204 | .0204 | .0204 | .0272 | Good |
| 0.01 | 45.24 | 39.16 | 10.19 | 5.40 | 0.001 | 2 | 2 | 1 | .0243 | .0162 | .0324 | .0728 | Good |
| 0.01 | 49.93 | 21.61 | 22.50 | 5.96 | 0.001 | 2 | 1 | 2 | .0216 | .0216 | .0144 | .0216 | Good |
| 0.01 | 25.83 | 44.72 | 23.27 | 6.16 | 0.001 | 1 | 2 | 2 | .0239 | .0279 | .0318 | .0318 | Good |
| 0.01 | 41.06 | 35.54 | 18.50 | 4.90 | 0.001 | 2 | 2 | 2 | .0348 | .0385 | .0308 | .0232 | Good |

TABLE V

LINEAR CORRELATION EQUATIONS FOR CORROSION DATA

Icorr = A + B(Na/V) + C(Mg/V) + D(Si/V) + E(Al/V) + F(Temp)

| SYSTEM | A | B (Na/V) | C (Mg/V) | D (Si/V) | E (Al/V) | F (Temp) | F Level |
|---|---|---|---|---|---|---|---|
| Na₂SO₄—MgSO₄—V₂O₅ | −12.83 | 11.41 | −1.894 | — | — | 0.0212 | 3.11 |
| Na₂SO₄—MgSO₄—SiO₂—V₂O₅ | −11.66 | 19.61 | −1.886 | −.6678 | — | 0.0187 | 0.89 |
| Na₂SO₄—Al₂O₃—V₂O₅ | −11.07 | 18.69 | — | — | −3.816 | 0.0265 | 2.89 |
| Na₂SO₄—Al₂O₃—MgSO₄—V₂O₅ | −27.89 | 17.86 | −1.568 | — | −2.426 | 0.0406 | 4.05 |
| Na₂SO₄—Al₂O₃—SiO₂—V₂O₅ | −5.616 | 6.696 | — | −.9521 | −1.960 | 0.0141 | 5.01 |
| Na₂SO₄—MgSO₄—SiO₂—Al₂O₃—V₂O₅ | −3.886 | 5.647 | −.5978 | −.6945 | −1.126 | 0.0087 | 2.21 |

TABLE VI

Burner Test Results

| | Na/V | Wt Collected (Mg/cm³) | | | % Wt Change on Brushing | | | | Na/V | Wt Collected (Mg/cm³) | | | % Wt Change on Brushing | | |
|---|---|---|---|---|---|---|---|---|---|---|---|---|---|---|---|
| | | 600 | 750 | 900 | 600 | 750 | 900 | | | 600 | 750 | 950 | 600 | 750 | 900 |
| Al/V | | | | | | | | (Mg + Al)/V | | | | | | | |
| 1 | .01 | | .574 | 1.016 | | 3.2 | 4.2 | 1 | .01 | .394 | .407 | .866 | 8.3 | 0.0 | 2.1 |
| 1 | .1 | | .753 | .966 | | 4.3 | 0.0 | 1 | .1 | .242 | .518 | .463 | 0.0 | — | 0.0 |
| 1 | 1 | .614 | .603 | 2.132 | 0.0 | 2.4 | 1.4 | 1 | 1 | .332 | .479 | 1.926 | 11.1 | 0.0 | — |
| 3 | .01 | .412 | 1.019 | .574 | 20.0 | 1.8 | — | 3 | .01 | .407 | .529 | 1.084 | — | 3.4 | 1.6 |
| 3 | .1 | .421 | .271 | 1.118 | 7.7 | 0.0 | 3.9 | 3 | .1 | .250 | .495 | .841 | 0.0 | 0.0 | 8.0 |
| 3 | 1 | .631 | .528 | 1.479 | 8.1 | — | 0.0 | 3 | 1 | .249 | .642 | 1.113 | — | 0.0 | 2.5 |
| 5 | .01 | .582 | .819 | 1.176 | 3.1 | 2.2 | 5.8 | 5 | .01 | .182 | .573 | .981 | 7.7 | 3.6 | 3.8 |
| 5 | .1 | .182 | 1.154 | 1.195 | 20.0 | 46.4 | 8.2 | 5 | .1 | .201 | .393 | .742 | 0.0 | 7.7 | 5.9 |
| 5 | 1 | 0 | .794 | 1.732 | — | 2.0 | — | 5 | 1 | .268 | 1.075 | .322 | — | 2.85 | 0.0 |
| (Al + Si)/V | | | | | | | | (Mg + Al)/V = Si/V | | | | | | | |
| 1 | .01 | | .834 | 1.152 | — | 1.6 | | 1 | .01 | .524 | 1.145 | | 3.2 | 4.6 | |
| 1 | .1 | | .492 | 1.130 | 0.0 | 7.9 | | 1 | .1 | .438 | 1.211 | | 0.0 | 0.0 | |
| 1 | 1 | | .480 | 1.319 | 3.1 | — | | 1 | 1 | .546 | 1.666 | | 0.0 | 0.0 | |
| 3 | .01 | | .628 | .960 | — | 1.8 | | 3 | .01 | .438 | 1.163 | | 10.3 | 1.4 | |
| 3 | .1 | | .799 | 1.268 | 4.7 | 2.8 | | 3 | .1 | .738 | 1.164 | | 19.2 | 8.8 | |
| 3 | 1 | | .138 | 1.235 | 0.0 | 2.3 | | 3 | 1 | .600 | 1.736 | | 0.0 | 0.0 | |
| 5 | .01 | | .370 | 1.288 | 9.1 | 5.8 | | 5 | .01 | .425 | 1.352 | | 24.0 | 18.8 | |
| 5 | .1 | | .604 | 1.590 | 19.4 | 16.1 | | 5 | .1 | .448 | 1.231 | | 36.0 | 37.9 | |

TABLE VI-continued

| | | Burner Test Results | | | | | | | | | | | | |
|---|---|---|---|---|---|---|---|---|---|---|---|---|---|---|
| | | Wt Collected (Mg/cm³) | | | % Wt Change on Brushing | | | | | Wt Collected (Mg/cm³) | | | % Wt Change on Brushing | |
| | Na/V | 600 | 750 | 900 | 600 | 750 | 900 | | Na/V | 600 | 750 | 950 | 600 | 750 | 900 |
| 5 | 1 | | .829 | 1.494 | | 2.3 | 0.0 | 5 | 1 | | .649 | 2.287 | | 20.6 | 1.6 |

We claim:

1. A corrosion inhibiting composition comprising a combination of aluminum, magnesium and silicon present in a form permitting dispersion in hydrocarbon fuel oil, the weight ratio of Mg to Al being between 0.01 to 100 and the weight ratio, (Mg+Al)/Si, being between 0.01 and 100, aluminum and magnesium constituting 100% of the metals present in said composition.

2. A corrosion inhibiting composition of claim 1 wherein said weight ratio of Mg to Al is from 0.1 to 10 and said weight ratio, (Mg+Al)/Si, is between 0.1 and 10.

3. A corrosion inhibiting composition of claim 1 wherein said aluminum, magnesium and silicon are present in the form of sulfates, oxides or carbonates or in organic oil soluble form.

4. A fuel composition comprising a hydrocarbon fuel oil containing corrosive amounts of sodium and vanadium, and an amount of the composition of claim 1 sufficient to inhibit corrosion due to the presence of said sodium and vanadium.

5. A fuel composition of claim 4 wherein the weight ratio, (Mg+Al+Si)/V, is between 0.25 and 10.

6. A fuel composition comprising a hydrocarbon fuel oil containing corrosive amounts of sodium and vanadium, and an amount of the composition of claim 2 sufficient to inhibit corrosion due to the presence of said sodium and vanadium.

7. A fuel composition of claim 6 wherein the weight ratio, (Mg+Al+Si)/V, is between 0.76 and 6.

8. A fuel composition comprising a hydrocarbon fuel oil containing corrosive amounts of sodium and vanadium, and an amount of the composition of claim 3 sufficient to inhibit corrosion due to the presence of said sodium and vanadium.

9. A process of inhibiting corrosion resulting from the presence of sodium and vanadium in a hydrocarbon fuel oil which comprises adding to said hydrocarbon fuel oil an amount of the composition of claim 1 sufficient to inhibit corrosion due to the presence of said sodium and vanadium.

10. A process according to claim 9 wherein sufficient corrosion inhibiting composition is added so that the weight ratio, (Mg+Al+Si)/V, in the final fuel composition is between 0.25 and 10.

11. A process of inhibiting corrosion resulting from the presence of sodium and vanadium in a hydrocarbon fuel oil, which comprises adding to said hydrocarbon oil an amount of the composition of claim 2 sufficient to inhibit corrosion due to the presence of said sodium and vanadium.

12. A process according to claim 11 wherein sufficient corrosion inhibiting composition is added so that the weight ratio, (Mg+Al+Si)/V, in the final fuel composition is between 0.76 and 6.

13. A process of inhibiting corrosion resulting from the presence of sodium and vanadium in a hydrocarbon fuel oil which comprises adding to said hydrocarbon fuel oil an amount of the composition of claim 3 sufficient to inhibit corrosion due to the presence of said sodium and vanadium.

14. A corrosion inhibiting composition of claim 1 wherein said aluminum is present as $Al_2O_3$, said magnesium is present as $MgSO_4$ and said silicon is present is $SiO_2$.

* * * * *